US012643527B2

(12) United States Patent
Marx et al.

(10) Patent No.: US 12,643,527 B2
(45) Date of Patent: Jun. 2, 2026

(54) METHOD FOR OPERATING A BRAKING SYSTEM OF A VEHICLE AND VEHICLE CONTROL SYSTEM FOR CONTROLLING AUTONOMOUS PARKING PROCESSES

(71) Applicant: ZF Active Safety GmbH, Koblenz (DE)

(72) Inventors: Andreas Marx, Hartenfels (DE); Frank Einig, Ochtendung (DE); Frank Schmidt, Brodenbach (DE); Eugen Lanze, Urbar (DE)

(73) Assignee: ZF Active Safety GmbH, Kobienz (DE)

( * ) Notice: Subject to any disclaimer, the term of this patent is extended or adjusted under 35 U.S.C. 154(b) by 198 days.

(21) Appl. No.: 18/186,462

(22) Filed: Mar. 20, 2023

(65) Prior Publication Data

US 2023/0303063 A1     Sep. 28, 2023

(30) Foreign Application Priority Data

Mar. 24, 2022     (DE) .......................... 102022106986.9

(51) Int. Cl.
B60W 10/18          (2012.01)
B60W 30/06          (2006.01)
(Continued)

(52) U.S. Cl.
CPC ............ B60W 10/18 (2013.01); B60W 30/06 (2013.01); B60W 50/0205 (2013.01); B60W 50/023 (2013.01); B60T 2270/402 (2013.01)

(58) Field of Classification Search
CPC .. B60W 10/18; B60W 30/06; B60W 50/0205; B60W 50/023; B60W 10/182;
(Continued)

(56) References Cited

U.S. PATENT DOCUMENTS 4,701,854 A   *  10/1987  Matsuda ................... B60T 8/94
                                                            701/76
6,626,271 B1 *   9/2003  Bohm ...................... B60T 13/74
                                                            188/158
(Continued)

FOREIGN PATENT DOCUMENTS

DE      102015214117 A1     2/2017
DE      102020202477 A1     8/2021
DE      102021112049 A1     11/2021

*Primary Examiner* — Lindsay M Low
*Assistant Examiner* — Brian R Kirby
(74) *Attorney, Agent, or Firm* — Kristin L. Murphy

(57)          ABSTRACT

The disclosure relates to a method for operating a braking system of a vehicle during autonomous parking processes, including a first electronic control unit, a service brake system, and a partial braking system. The first control unit is designed for activating the service brake system and the partial braking system, in which an autonomous parking process is initiated, followed by an activation of the service brake system by the first control unit to generate a braking force. In the event of a failure of the service brake system, the partial braking system is activated by the first control unit to generate a braking force while the autonomous parking process is continued by utilising the partial braking system. The disclosure also relates to a vehicle control system for controlling autonomous parking processes.

10 Claims, 3 Drawing Sheets

(51) Int. Cl.
*B60W 50/02*      (2012.01)
*B60W 50/023*     (2012.01)

(58) Field of Classification Search
CPC ... B60T 2270/402; B60T 2201/10; B60T 7/12
See application file for complete search history.

(56) References Cited

U.S. PATENT DOCUMENTS

| | | | | |
|---|---|---|---|---|
| 2008/0105502 | A1* | 5/2008 | Koth | B60T 7/085 |
| | | | | 188/72.1 |
| 2013/0282249 | A1* | 10/2013 | Heise | B60T 13/746 |
| | | | | 701/70 |
| 2015/0134178 | A1* | 5/2015 | Minoiu-Enache | B60W 30/00 |
| | | | | 701/23 |
| 2015/0251639 | A1* | 9/2015 | Sautter | B60T 8/885 |
| | | | | 701/70 |
| 2017/0166173 | A1* | 6/2017 | Lauffer | B60T 13/662 |
| 2017/0341634 | A1* | 11/2017 | Heise | B60T 13/662 |
| 2018/0345938 | A1* | 12/2018 | Rebholz-Goldmann | |
| | | | | B60T 17/221 |
| 2019/0092297 | A1* | 3/2019 | Ayichew | B60T 13/662 |
| 2019/0152459 | A1* | 5/2019 | Dieckmann | B60T 13/662 |
| 2019/0340090 | A1* | 11/2019 | Grabs | G05D 1/0077 |
| 2019/0344762 | A1* | 11/2019 | Alfter | B60W 50/023 |
| 2020/0114888 | A1* | 4/2020 | Michels | B60T 8/4077 |
| 2021/0070269 | A1* | 3/2021 | Passmann | B60T 8/96 |
| 2021/0070312 | A1* | 3/2021 | Decius | B60W 50/029 |
| 2021/0146900 | A1* | 5/2021 | Einig | B60T 13/662 |
| 2021/0171062 | A1* | 6/2021 | Hecker | B60W 60/0015 |
| 2022/0340118 | A1* | 10/2022 | Meyer | B60T 13/741 |

* cited by examiner

METHOD FOR OPERATING A BRAKING SYSTEM OF A VEHICLE AND VEHICLE CONTROL SYSTEM FOR CONTROLLING AUTONOMOUS PARKING PROCESSES

CROSS-REFERENCE TO RELATED APPLICATION

This application claims priority to German Priority Application No. 102022106986.9, filed Mar. 24, 2022, the disclosure of which is incorporated herein by reference in its entirety.

TECHNICAL FIELD

The disclosure relates to a method for operating a braking system of a vehicle and to a vehicle control system for controlling autonomous parking processes.

BACKGROUND

An autonomous parking process permits a parking of a vehicle in a parking spot without active intervention by the driver. It is also typical or, depending on the vehicle, possible that the driver him/herself is outside the vehicle during the process and an active intervention on the steering wheel, accelerator pedal, and brake pedal is not possible in any way. The autonomous parking process typically takes place at a walking pace and, thus, at speeds <10 km/h.

An activation of the service brake is necessary in order to enable an autonomous parking process of this type. The service brake is understood to be the brake that is also used in a normal driving operation at a maximum vehicle speed to generate a braking force at four wheels in order to decelerate the vehicle and, if necessary, bring the vehicle to a standstill.

In addition to the service brake, vehicles also include a parking brake. This is also referred to as a parking brake, is designed independently of the service brake of the motor vehicle, and is used for securely holding a vehicle at a standstill.

In autonomous parking processes, if the service brake system fails, the autonomous parking process in the previous related art is immediately aborted and the vehicle is safely decelerated and held at a standstill by activating the parking brake. As a result, the parking process is not concluded and the driver is forced to enter the vehicle, release the parking brake, and manually end the parking process.

SUMMARY

What is needed is an ability to reliably carry out and conclude autonomous parking processes, so that the availability of the autonomous parking function is increased and is safe nevertheless. In addition, the rate of aborted autonomous parking processes due to faults in the service brake system needs to be reduced.

A method for operating a braking system of a vehicle during autonomous parking processes is proposed herein, which includes a first electronic control unit, wherein the first control unit is designed for activating a service brake system and a partial braking system, including the following steps:

a) initiating an autonomous parking process;

b) activating the service brake system by operation of the first control unit in order to generate a braking force; and c) in an event of failure of the service brake system, activating the partial braking system by operation of the first control unit in order to generate a braking force during the continuation of the autonomous parking process by utilising the partial braking system.

One exemplary aspect of the disclosure is that of increasing the availability of the function of autonomous parking processes by way of the first electronic control unit activating the partial braking system in a smooth transition in the event of a fault of the service brake system that results in a failure of the system, so that the braking demand is transmitted to the partial braking system from the service brake system by the control unit.

This makes it possible to continue the autonomous parking process that may have already begun and to conclude the autonomous parking process by utilising the partial braking system. In other words, the possibility of activating the partial braking system by operation of the first electronic control unit forms a fallback support for the case in which the service brake system fails.

The braking force generated by the partial braking system fully suffices to safely guide the vehicle into the parking spot and shut down the vehicle due to the low speeds that are present anyway in autonomous parking processes and are typically in the walking speed range and, thereby, <10 km/h.

In the event of a failure of the first control unit during an autonomous parking process, a second control unit, which is designed for activating the partial braking system and is coupled to the first control unit via a communication link, can carry out an activation of the partial braking system in order to generate a braking force. The first control unit can output a fault message, for example, during the autonomous parking process, the fault message being transmitted via the communication link to the second control unit, so that the second control unit receives the command to take over the autonomous parking process. As a result, another fallback support is created, so that the autonomous parking process can be concluded also in the event of a failure of the first control unit and an availability of the parking brake function is also ensured in such a case.

The communication links can be redundantly designed and form part of a CAN bus system.

In the event of a failure of the first and the second control units during an autonomous parking process, a third control unit, which is designed for activating the service brake system and/or the partial braking system and is coupled to the first and/or the second control unit(s) via a communication link, can carry out an activation of the partial braking system in order to generate a braking force. This can take place via separate control lines, which extend past the first and the second control units from the third control unit to the partial braking system.

Therefore, another fallback support is formed by the third control unit, so that the autonomous parking process can be carried out by the third control unit independently of the first and the second control unit(s).

Via the communication links between the first and the third control unit(s) and between the second control unit and the third control unit, it is ensured that the third control unit registers a failure of the first and the second control unit(s) and ensures, by immediately taking over the activation of the partial braking system, that the autonomous parking process can be continued.

Due to the separate control lines, the third control unit does not need to access the control lines of the first or the second control unit(s) to the service brake system and/or to the partial braking system, as the result of which a further redundancy is effectuated.

The communication links between the first and the third control unit(s) and between the second control unit and the third control unit can also be redundantly designed and part of a CAN bus system.

The third control unit can be designed for controlling an autonomous driving of the vehicle and/or an autonomous parking process. This has the advantage that an additional third control unit does not need to be provided in the vehicle, but rather the existing control unit, which is used for the autonomous driving of the vehicle, can be accessed. The third control unit is therefore, for example, a control unit connected upstream from the other two control units.

In the event of a failure of the first and the second control unit(s) during an autonomous parking process, the third control unit activates the service brake system and/or the partial braking system while the autonomous parking process is continued. Therefore, the third control unit takes over not only the activation of the braking systems, but also enables a continuation of the autonomous parking process until the autonomous parking process has been concluded.

Moreover, a control unit of this type is typically coupled to the service brake system and the partial braking system via separate control lines anyway, so that additional control lines also do not need to be provided.

The service brake system can be a hydraulic or electro-mechanical braking system. The electro-mechanical braking system permits a particularly simple and uncomplicated activation. In addition, multiple control units can be easily coupled to a braking system of this type.

The second partial braking system can be an electro-mechanical parking brake. Therefore, the second partial braking system is completely separated from the service brake system and designed as a closed independent system. A fault or failure of the service brake system in no way adversely affects the partial braking system.

In addition, an electro-mechanical parking brake is typically present in vehicles anyway, so that an additional partial braking system does not need to be installed in the vehicle. Electro-mechanical parking brakes can also be particularly easily activated and can be easily coupled to multiple control units.

The problem mentioned at the outset is also solved by a vehicle control system for controlling autonomous parking processes, including a braking system of a vehicle, which includes a service brake system and a partial braking system, and a first electronic control unit, wherein the first control unit for activating a service brake system and a partial braking system is designed in such a way that the first control unit can initiate an autonomous parking process, activate the service brake system by a first control unit in order to generate a braking force and, in the event of a failure of the service brake system, activate the partial braking system in order to generate a braking force during the continuation of the autonomous parking process by utilising the partial braking system.

Reference is made to the aforementioned explanations with respect to the resultant advantages.

In one exemplary arrangement, a second control unit can be present, which, in the event of the failure of the first control unit, is able to activate the partial braking system during the on-going autonomous parking process. As a result, a smooth transfer of the task of generating braking force from the first control unit to the second control unit takes place during the autonomous parking process.

In addition, a third control unit can be present, which, in the event of the failure of the first and the second control unit(s), is able to activate the partial braking system during the on-going autonomous parking process.

For example, the third control unit even controls the entire autonomous parking process regardless of whether the first and/or the second control unit(s) are/is functional or not. Reference is made to the aforementioned explanations with respect to the resultant advantages.

BRIEF DESCRIPTION OF DRAWINGS

The disclosure is explained in the following with reference to an exemplary arrangement, which is shown in the attached drawings. In the drawings.

DETAILED DESCRIPTION

Figure 1:
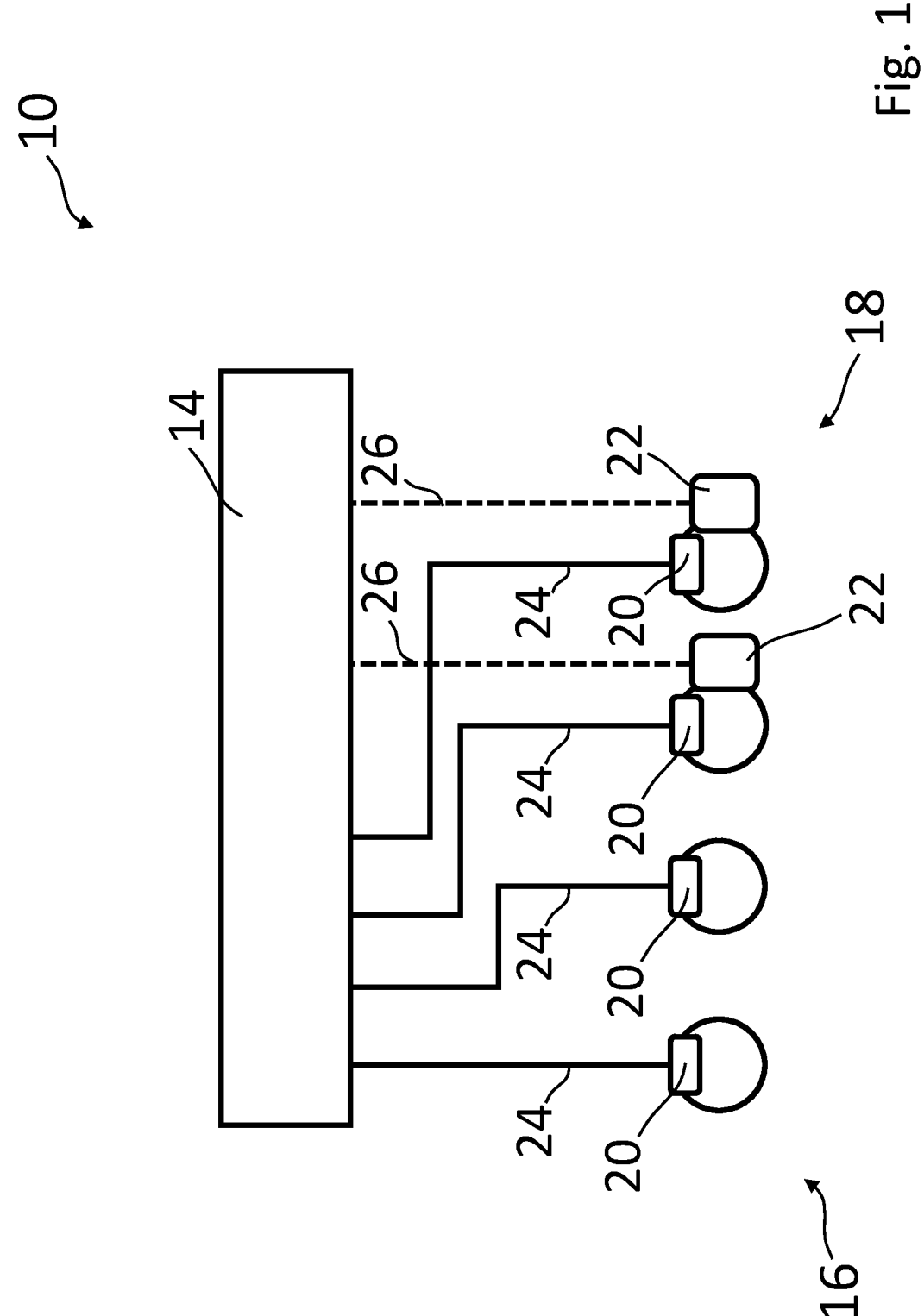
FIG. 1 shows a schematic view of the vehicle control system according to the disclosure.

FIG. 1 shows a vehicle control system 10 for controlling autonomous parking processes of vehicles. The vehicle control system 10 includes a braking system 12 and a first electronic control unit 14.

The braking system 12 is divided into a service brake system 16 and a partial braking system 18.

The service brake system 16 is a braking system that is used in the normal driving operation in order to build up a braking force at all wheels and to decelerate the vehicle and, if necessary, bring the vehicle to a standstill.

The service brake system 16 is formed by a hydraulic or electro-mechanical braking system 20.

The partial braking system 18 is formed by an electro-mechanical parking brake 22 and is used primarily for holding the vehicle at a standstill.

The first electronic control unit 14 is connected via control lines 24 to the brakes of the service brake system 16 and via control lines 26 to the electro-mechanical parking brake 22 of the partial braking system 18.

Figure 2:
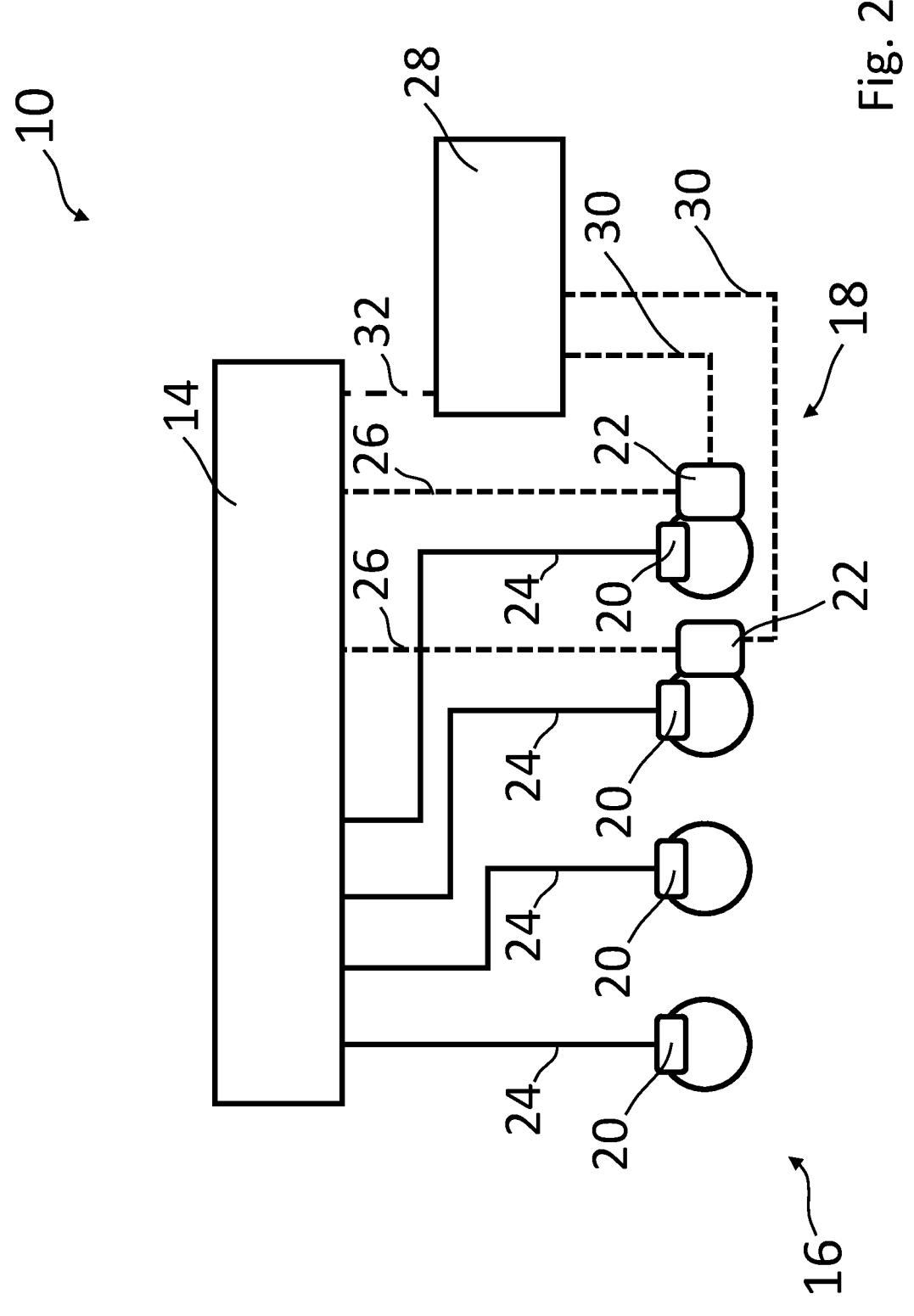
FIG. 2 shows a schematic view of the vehicle control system according to the disclosure according to a first alternative exemplary arrangement, including a second control unit.

FIG. 2 shows a vehicle control system 10 according to a first alternative exemplary arrangement, in which, in contrast to the vehicle control system 10 from FIG. 1, a second electronic control unit 28 is additionally provided, which is connected via separate control lines 30 to the electro-mechanical parking brakes 22 of the partial braking system 18.

In addition, in this first alternative, a communication link 32 is provided between the first electronic control unit 14 and the second electronic control unit 28.

The communication link 32 can be redundantly designed and also form part of a CAN bus system.

Figure 3:
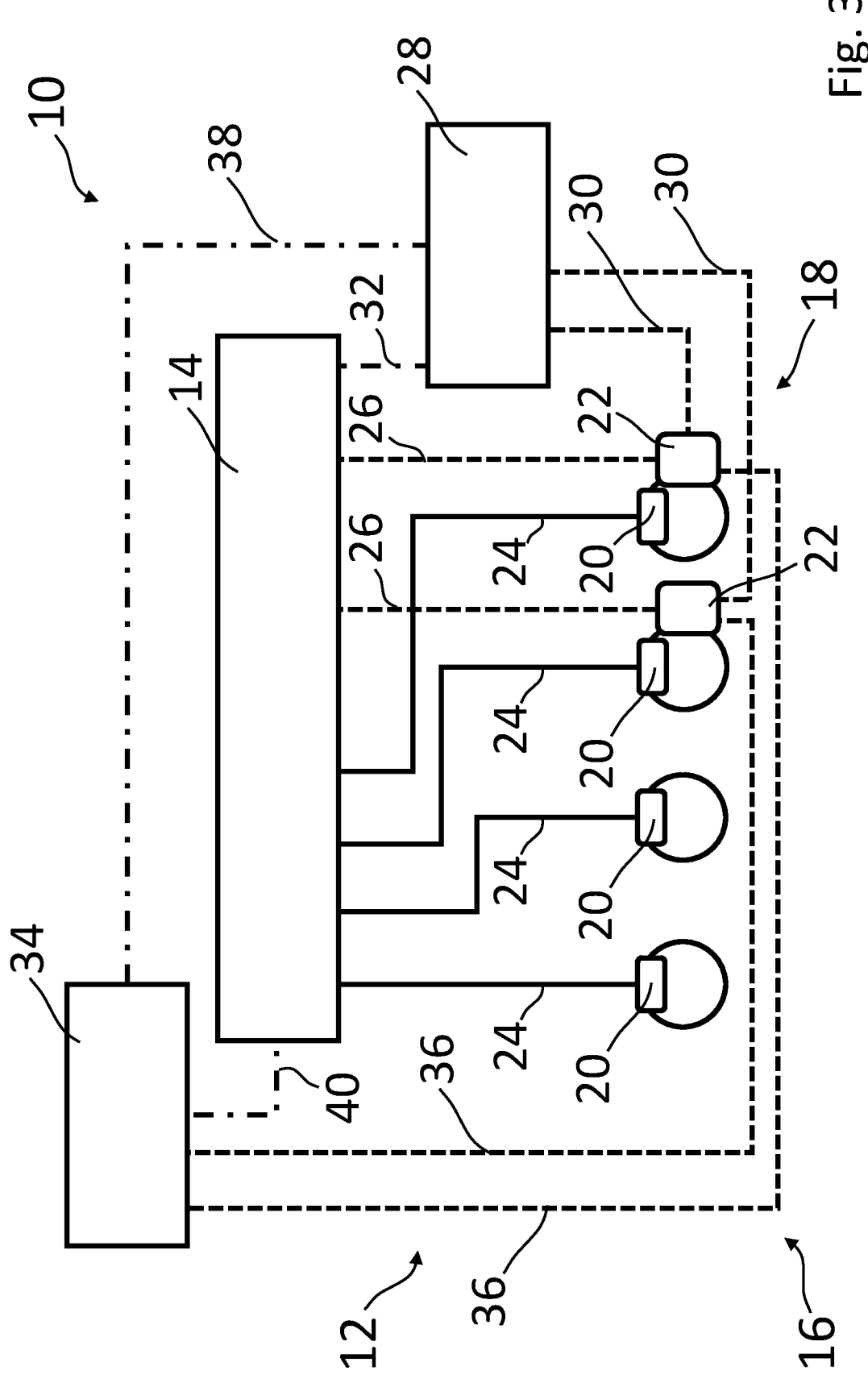
FIG. 3 shows a schematic view of the vehicle control system according to the disclosure according to a second alternative exemplary arrangement, including a second and a third control unit.

FIG. 3 shows a vehicle control system 10 according to a second alternative exemplary arrangement, in which, in contrast to the first alternative exemplary arrangement, a third electronic control unit 34 is additionally provided, which is designed for controlling an autonomous driving of the vehicle and an autonomous parking, and which is coupled via separate control lines 36 to the electro-mechanical parking brakes 22 of the partial braking system 18. In addition, the third electronic control unit 34 is connected to the brakes of the service brake system 16 via further control lines (not shown in FIG. 3 for the sake of clarity).

In addition, a communication link 40 is provided between the third electronic control unit 34 and the first electronic control unit 14, and a communication link 38 is provided, which connects the third electronic control unit 34 to the second electronic control unit 28.

The operation of the vehicle control system 10 for controlling autonomous parking processes is described in the following for each alternative with reference to FIGS. 1 through 3.

In a vehicle control system 10 according to FIG. 1, initially, the autonomous parking process is initiated in a first step. In order to generate a braking force during the autonomous parking process, the service brake system 16 is activated during the parking process by the first control unit 14 via the control lines 24, so that, for example, a change in the direction of travel can be carried out.

If a fault is detected in the service brake system 16, for example, by the first control unit 14, which results or could result in the failure or partial failure of the service brake system 16, the first control unit 14 activates the electromechanical parking brake 22 of the partial braking system 18 in order to generate a braking force, wherein the autonomous parking process is continued from this point forward by utilising the partial braking system 18 and can be concluded.

The transfer of the generation of braking force to the partial braking system by the first control unit takes place in a smooth transition, so that the autonomous parking process is not aborted and does not come to a halt.

In the alternative exemplary arrangement shown in FIG. 2, in which a second electronic control unit 28 is provided, the autonomous parking process can also be continued in the event of a failure of the first control unit 14, Therefore, if a fault is present that results or could result in the failure of the first control unit 14, this is communicated to the second control unit 28 from the first control unit 14 via the communication link 32. As a result, the second control unit 28 takes over the activation of the partial braking system 18 via the control lines 30 without interruption and the autonomous parking process is continued and can be concluded.

If it happens that both the first control unit 14 and the second control unit 28 fail, then, according to the alternative arrangement shown in FIG. 3, the third control unit can be activated, the third control unit being designed for controlling the autonomous driving and parking of the vehicle.

A failure of the first control unit 14 and of the second control unit 28 can be communicated to the third control unit 34 via the communication links 38, 40.

Alternatively, the third control unit 34 can also permanently monitor the first control unit 14 and the second control unit 28 via the communication links 38, 40.

Therefore, in the event of a failure of the first control unit 14 and the second control unit 28 during the autonomous parking process, the activation of partial braking system 18 for generating a braking force is carried out by the third control unit 34.

In this case as well, the autonomous parking process is continued by the operation of the third control unit 34 by utilising the partial braking system 18 and can be concluded.

The activation of the partial braking system 18 by the third control unit 34 also takes place in a smooth transition, so that the autonomous parking process is not aborted and does not come to a halt.

Since the third control unit is coupled not only to the partial braking system 18 via the control lines (not shown in FIG. 3), but also to the service brake system 16 and can control the service brake system 16, it is also conceivable that the third control unit 34 activates the service brake system 16 instead of the partial braking system 18 during the parking process, provided that the service brake system 16 is not affected by a failure.

The invention claimed is:

1. A method for operating a braking system of a vehicle during autonomous parking processes, including a first electronic control unit, wherein the first control unit is designed for activating a service brake system and a partial braking system, comprising the following steps:
    initiating an autonomous parking process;
    activating the service brake system by operation of the first control unit in order to generate a braking force;
    in an event of failure of the service brake system, activating the partial braking system by operation of the first control unit in order to generate a braking force during a continuation of the autonomous parking process by utilising the partial braking system;
    wherein, in the event of a failure of the first control unit during an autonomous parking process, a second control unit, which is designed for activating the partial braking system and is coupled to the first control unit via a first communication link, carries out an activation of the partial braking system in order to generate a braking force, wherein the first control unit communicates failure of the first control unit to the second control unit via the first communication link,
    wherein, in the event of a failure of the first and of the second control units during an autonomous parking process, a third control unit, which is an upstream control unit designed for controlling autonomous driving of the vehicle and is coupled to the first control unit via the communication link and coupled to the second control unit via a second communication link, carries out an activation of the partial braking system in order to generate a braking force, wherein the first control unit communicates failure of the first control unit to the third control unit via the first communication link and the second control unit communicates failure of the second control unit to the third control unit via the second communication link, the second communication link different from the first communication link,
    wherein activation of the partial braking system occurs in a smooth transition so as not to abort the autonomous parking process that the autonomous parking process continues uninterrupted to completion, and
    wherein the third control unit takes over control of the entire autonomous parking process upon failure of the first and second control units to guide the vehicle safely into a parking spot.

2. The method for operating a braking system according to claim 1, wherein the third control unit is designed for controlling an autonomous driving.

3. The method for operating a braking system according to claim 1, wherein, in the event of a failure of the first and the second control units during the autonomous parking process, the third control unit activates the service brake system and/or the partial braking system while the autonomous parking process is continued.

4. The method for operating a braking system according to claim 1, wherein the service brake system is a hydraulic or electro-mechanical braking system.

5. The method for operating a braking system according to claim 1, wherein partial braking system is an electro-mechanical parking brake.

6. The method for operating a braking system according to claim 1, wherein, the third control unit carries out the activation of the partial braking system to generate a braking force via separate control lines, which extend past the first and the second control units from the third control unit to the partial braking system.

7. The method for operating a braking system according to claim 2, wherein, in the event of a failure of the first and the second control units during the autonomous parking process, the third control unit activates the service brake system and/or the partial braking system while the autonomous parking process is continued.

8. The method for operating a braking system according to claim 6, wherein the service brake system is a hydraulic or electro-mechanical braking system.

9. The method for operating a braking system according to claim 8, wherein the partial braking system is an electro-mechanical parking brake.

10. The method for operating a braking system according to claim 4, wherein the partial braking system is an electro-mechanical parking brake.

\* \* \* \* \*